(12) United States Patent
Abdelrahman et al.

(10) Patent No.: US 11,992,019 B2
(45) Date of Patent: May 28, 2024

(54) METHOD AND SYSTEM FOR REGULATING LEAVENING REACTIONS

(71) Applicant: General Mills, Inc., Minneapolis, MN (US)

(72) Inventors: Abdel Abdelrahman, Fairfield, CT (US); Bruce W Robb, St. Louis Park, MN (US); David J Domingues, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 773 days.

(21) Appl. No.: 16/868,007

(22) Filed: May 6, 2020

(65) Prior Publication Data

US 2020/0260740 A1  Aug. 20, 2020

Related U.S. Application Data

(63) Continuation of application No. 14/398,802, filed as application No. PCT/US2013/039629 on May 6, 2013, now Pat. No. 10,694,756.

(60) Provisional application No. 61/643,952, filed on May 8, 2012.

(51) Int. Cl.
*A21D 2/02* (2006.01)
*A21D 6/00* (2006.01)
*A21D 10/02* (2006.01)

(52) U.S. Cl.
CPC .............. *A21D 2/02* (2013.01); *A21D 6/001* (2013.01); *A21D 10/025* (2013.01); *A23V 2002/00* (2013.01); *A23V 2200/234* (2013.01)

(58) Field of Classification Search
CPC .............................. A21D 2/02; A21D 10/025
See application file for complete search history.

(56) References Cited

U.S. PATENT DOCUMENTS

| | | | |
|---|---|---|---|
| 4,381,315 A | 4/1983 | Yong et al. | |
| 5,064,661 A | 11/1991 | Verduin | |
| 5,409,724 A * | 4/1995 | Heidolph | A21D 2/02 426/562 |
| 5,451,417 A | 9/1995 | Freyn et al. | |
| 5,882,712 A | 3/1999 | Wu | |
| 6,165,533 A | 12/2000 | Laughlin et al. | |
| 7,771,682 B2 | 8/2010 | Ghosh et al. | |
| 2003/0113424 A1* | 6/2003 | Huang | A21D 2/14 426/551 |
| 2004/0081738 A1* | 4/2004 | Murty | A21D 13/40 426/557 |
| 2005/0271773 A1 | 12/2005 | Domingues | |
| 2007/0191214 A1 | 8/2007 | Ghosh et al. | |
| 2008/0193612 A1 | 4/2008 | Domingues et al. | |

(Continued)

FOREIGN PATENT DOCUMENTS

| | | |
|---|---|---|
| WO | WO 1995/007630 | 3/1995 |
| WO | WO 2007/088407 | 8/2007 |

(Continued)

*Primary Examiner* — Felicia C Turner
(74) *Attorney, Agent, or Firm* — Diederiks & Whitelaw, PLC; John L. Crimmins, Esq.

(57) ABSTRACT

A method and system for regulating the reaction rate of leavening agents in a dough product is described. The method and system include adding a regulating agent to a leavening system to manipulate the rate of reaction of the leavening agents in the dough.

20 Claims, 3 Drawing Sheets

(56) References Cited

U.S. PATENT DOCUMENTS

| | | |
|---|---|---|
| 2010/0098815 A1 | 4/2010 | Norquist et al. |
| 2011/0064853 A1* | 3/2011 | Maki .................. A23L 27/45 |
| | | 426/649 |
| 2011/0212228 A1 | 9/2011 | Robb et al. |
| 2012/0003358 A1 | 1/2012 | Vadlamani et al. |

FOREIGN PATENT DOCUMENTS

| | | |
|---|---|---|
| WO | WO 2009/099466 | 8/2009 |
| WO | WO2009/117702 | 9/2009 |

* cited by examiner

METHOD AND SYSTEM FOR REGULATING LEAVENING REACTIONS

CROSS-REFERENCE TO RELATED APPLICATIONS

This application represents a continuation application of application Ser. No. 14/398,802, filed Nov. 4, 2014, entitled "Method and System for Regulating Leavening Reactions", pending, which is a U.S. National Stage of International Application Serial No.: PCT/US2013/039629, filed May 6, 2013, and claims the benefit of U.S. Application Ser. No. 61/643,952 filed May 8, 2012. The entire contents of these application are incorporated herein by reference.

BACKGROUND OF THE INVENTION

Packaged dough products provide commercial and retail consumers with a convenient way to prepare fresh baked or cooked products without the need to make the dough from scratch. Commercial dough product manufacturers strive to produce dough products that result in baked or cooked products that have the same or similar organoleptic properties as a made-from-scratch product. In many cases, this goal requires that the dough product be proofed or partially proofed before it reaches the consumer, involving the use of leavening systems in the dough that can withstand the rigors of commercial dough manufacturing, packaging and distribution.

Chemical leavening systems are used to proof dough in many packaged dough products. Commercial dough product manufacturers have found challenges in providing a desired level of leavener-generated proofing during production, storage and distribution, and upon use by the consumer.

SUMMARY OF THE INVENTION

This invention involves regulating the reaction rate of the leavening system in a chemically leavened dough. The method for regulating the reaction rate of a leavening system includes providing a source of an alternate counter ion of one or more of the leavening agent ions.

The invention also includes a method for preparing a chemically-leavened packaged or canned dough product by combining a chemical leavening agent and a regulating agent with dough ingredients to make a dough; placing the dough in a package; and allowing the leavening agent and regulating agent to react in the dough to generate gas at a regulated rate sufficient to expand the dough to substantially fill the package, wherein the regulated rate is greater than a gas generation rate of the chemical leavening agent without the regulating agent.

The invention further includes a leavener regulation system for a chemically-leavened dough product, the system including a source of an alternate counter ion, wherein the alternate counter ion has an equivalent or greater affinity for one or more of the leavening agent ions as compared to the affinity of the leavening agent ions themselves. This leavening system provides in an increased leavening rate due to the presence of the alternate counter ion as compared to the leavening system without the alternate counter ion.

DETAILED DESCRIPTION OF THE INVENTION

Figure 1:
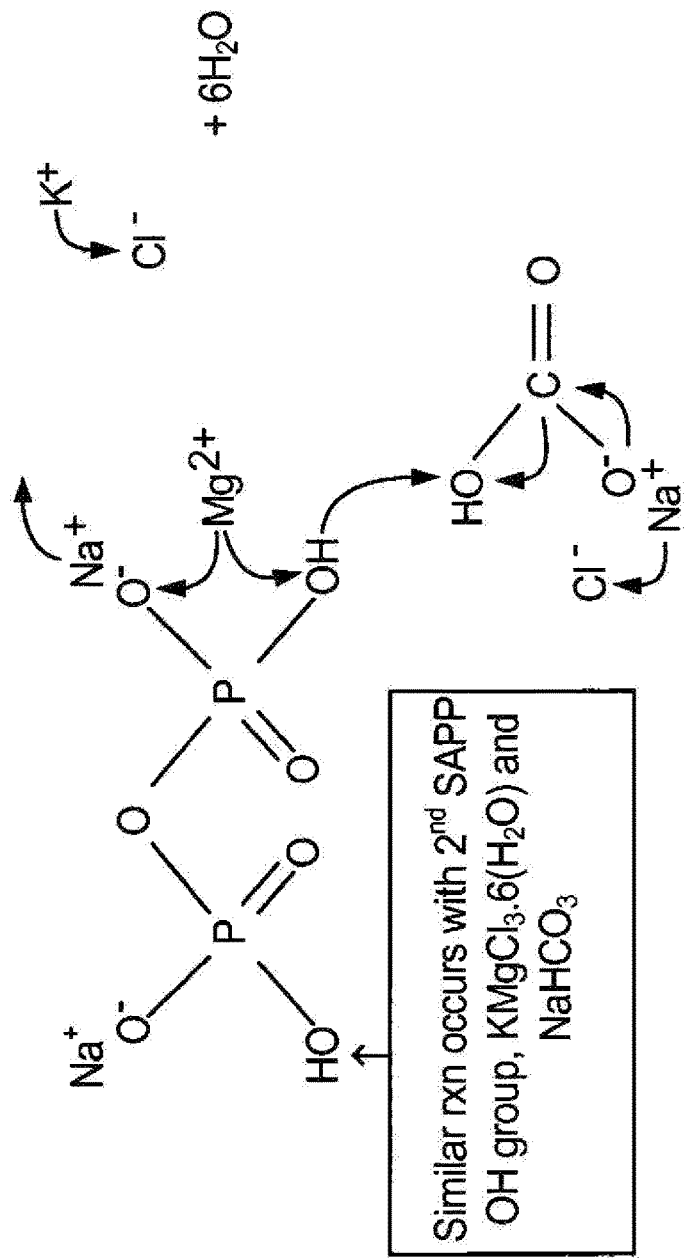
FIG. 1 is a diagram showing a proposed mechanism of action of carnallite as the source of the alternate counter ion with a sodium acid pyrophosphate leavening agent.

Dough products generally contain flour, water and a leavening agent, and may include other minor ingredients. Flour used to make dough can be any type of natural or synthetic flour known in the art, and can be used at levels ranging from about 45% to about 55% by weight of the total dough formula. Water is added in an amount sufficient to form a dough, generally ranging from about 20% to about 35% by weight. Fat may be used to create a desired texture in the baked or cooked dough product, and may be any type of vegetable, animal, dairy, or synthetic fat in solid, liquid, or semi-solid form. The fat content of doughs can vary significantly, ranging from about 0% to about 15% by weight. Minor ingredients may include flavorings, colorants, dough conditioners, emulsifiers, protein, processing aids, texture-enhancing aids, and the like, with levels varying from about 0% to about 10% or higher by weight.

Leavening agents are selected to provide the desired functional effects during dough production, packaging, storage, distribution, and final baking or cooking by the end user. The amount of leavening agent used varies depending on the type of ingredients used and the desired degree of leavening desired.

When mixing ingredients together to make a dough, the ingredients interact with each other chemically, in some cases altering an ingredient's original chemical composition to form a chemical derivative of that ingredient in the dough. When an ingredient is mentioned in this application, the chemical derivatives formed when preparing a dough with that ingredient are encompassed by the name of that ingredient. For example, "sodium bicarbonate" includes both the sodium ion and the bicarbonate ion, and any salts or other derivatives formed from sodium bicarbonate, when sodium bicarbonate is mixed with other ingredients to form a dough.

Chemically leavened dough products comprise a chemical leavening system combined with the flour and other dough ingredients and water to form the dough. As water is incorporated with the other dough ingredients, the chemical reaction of the leavening acid with the leavening base in the presence of water generates carbon dioxide gas. The following formula shows the general reaction of the leavening agents in the presence of water in the dough to produce carbon dioxide gas:

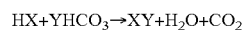

$$HX + YHCO_3 \rightarrow XY + H_2O + CO_2$$

where HX is the acidic salt of the leavening system, $YHCO_3$ is the alkaline bicarbonate of the leavening system, and XY is the neutral salt resulting from the reaction.

Many suitable leavening agents may be used in dough products. Examples of leavening acids in free and/or encapsulated form include, but are not limited to, sodium aluminum phosphate (SALP), sodium acid pyrophosphate (SAPP), sodium aluminum sulfate (SAS), glucono-delta-lactone (GDL), calcium phosphate, monocalcium phosphate (MCP), dicalcium phosphate (DCP), calcium acid pyrophosphate (CAPP), dimagnesium phosphate (DMP), monopotassium phosphate, potassium acid pyrophosphate, and combinations thereof. Non-limiting examples of leavening bases in free and/or encapsulated form include sodium bicarbonate (soda), potassium bicarbonate, ammonium bicarbonate, sodium carbonate, calcium carbonate and combinations thereof.

Gas generated by the leavening system, and the resulting dough volume expansion, is essential for providing baked or cooked dough-based products with their desired volume, texture and other functional and organoleptic properties. Some packaged dough products require a certain unbaked volume, or proofed volume, in order for the packaging system to function. As such, controlling or regulating the reaction rate of the leavening system to minimize gas production prior to packaging, and to maximize gas-generating capabilities after packaging until an equilibrium is reached, provide significant advantages to the commercial food manufacturer.

In a dough containing an unregulated leavening system, during the early mixing stages any gas being generated simply escapes into the surrounding environment. As mixing continues and the dough matrix develops, air cells are created in the dough. The gas generated by the leavening reaction migrates into these air cells, although some gas continues to be lost to the environment. Gas entering these air cells in the dough causes the dough to expand. If the dough is then packaged, any gas still being generated continues to be entrapped in the air cells in the dough, although much of the gas has already been generated prior to packaging.

Regulating the leavening reaction rate helps to delay gas generation until the dough is packaged so that at least a portion, most, substantially all, or all of the gas generation and dough expansion takes place after the dough is packaged. In order to achieve this goal, leavening agents may be encapsulated or otherwise manipulated, or sequestered from the other dough ingredients, to help regulate the reaction rate.

Canned Dough Products

One example of a packaged dough product is a canned dough product, which includes a self-sealing, hermetically sealed, pressurized package, such as a spirally wound can. Carbon dioxide generated in the dough after it is canned causes the dough to expand and fill all of the head space in the can, while evacuating air out of the package through specialized vents. The expanding dough then seals the vents from inside the can, creating a hermetically sealed package.

In a canned dough product, the initial leavening reaction rate must be fast enough to cause the dough to expand in the can, but not be so fast as to impede processing prior to the dough being canned. In general, headspace air in the can, i.e., the empty space in the can after the dough has been put into the can, needs to be vented out of the can within about the first 24 hours after canning the dough. This helps to alleviate detrimental reactions, such as gray dough formation.

Once the dough has been canned and allowed to expand in the can, a final package equilibrium resulting in a certain can pressure is reached so that further dough expansion does not occur. If the can pressure is too high, the can materials may fail to contain the dough. If the can pressure is too low, the headspace may not be entirely filled, causing dough deterioration. In some embodiments, a can final pressure of between about 12 psi to about 21 psi has been found useful.

To achieve this balance of leavening system requirements in a canned dough, the leavening reaction may be regulated by using physical sequestration of leavening ingredients from exposure to water, such as by adding them later during dough mixing, or encapsulating one or more of the leavening agents. Other or additional regulation methods have included using specific types and/or ratios or levels of leavening agents, such as slow- or fast-acting leaveners, or a combination thereof.

These manipulative leavener regulation methods, however, may require process and/or formula manipulations, and may introduce other effects, such as off-flavors, insufficient dough expansion, or non-uniform leavening distribution, as a result of such manipulation.

The invention is directed to the unexpected discovery that by providing a alternate counter ion to one or more of the leavening agents in the dough, the leavening system can be regulated to provide the desired timing and degree of gas generation within the dough. As used herein, "cationic counter ion" refers to an alternate counter ion having an affinity or electronegativity for a leavening agent anion equal to or greater than the affinity or electronegativity of the leavening agent cation for the same leavening agent anion. "Anionic counter ion" refers to an alternate counter ion having an affinity or eletronegativity for a leavening agent cation equal to or greater than the affinity or electronegativity of the leavening agent anion for the same leavening cation. The affinity of a leavening agent cation for a leavening agent anion shall be referred to as an "internal affinity."

If an alternate counter ion has a greater electronegativity than the leavener ions' electronegativity, the alternate counter ion has a greater tendency to attract electrons or electron density towards itself. Electronegativity is affected by atomic number and the distance of the valence electrons from the charged nucleus. This attraction for electrons translates into a greater attraction to or affinity for ions. The relative difference in electronegativity between the added counter ion and leavening ion determines the magnitude of the reaction.

Comparable alternate counter ion effects may be obtained with different leavening systems. In some embodiments, sodium-based leavening systems demonstrate a greater increase in reaction rate with the use of alternate counter ions than non-sodium-based leavening systems.

The alternate counter ion may have an equivalent or higher valency than one or more of the leavener ions.

It was discovered that by providing an alternate counter ion, once the leavening agents are mixed with the dough ingredients, one or more of the leavener ions will react preferentially with the alternate counter ion, thereby accelerating dissociation of the hydrogen ion and resulting in an accelerated production of carbon dioxide. While not intending to be bound by theory, it is believed that leavening reaction rate acceleration can occur by providing an alternate anionic counter ion, an alternate cationic counter ion, or a combination thereof.

By controlling the release of the alternate counter ion in the dough by using solubility properties or sequestration, it is possible to trigger this accelerated leavening reaction at the desired time, such as after the dough has been packaged, so that at least a portion, most, substantially all or all of the leavening reaction and gas generation takes place after the dough is packaged. This degree of control facilitates the use of lower leavener levels, so that the leavener releases more carbon dioxide once the dough is in the package rather than prior to being in the package. This method of regulation may also or alternatively facilitate the use of slow-acting leavening agents, since the acceleration of the reaction rate will result in a sufficient amount of gas generation within the specified time.

By using a lower leavening level, nutritional aspects of the dough product can be enhanced. For example, many leavening agents contain sodium, so reducing the amount of sodium-based leaveners can result in an overall sodium content reduction in the dough product. In some embodiments, the sodium reduction achieved by the ability to use non-sodium leavening agents may be sufficient to make a reduced sodium, low sodium, or no sodium product that meets government guidelines to be labeled accordingly.

Another benefit of using an alternate counter ion to accelerate the reaction rate may be the ability to use of other types of leavening agents which were not previously used due to their slow reaction rate. For example, slow-acting leaveners containing a nutrient such as calcium can be used to increase the nutritional value of the dough product while attaining desired gas generation rates that were previously not possible.

Although manipulation of the leavening agents themselves is not required to regulate the leavening reaction as described herein, the invention includes the use of encapsulated or otherwise manipulated leavening agents together with the regulation system to further enhance the properties of the dough products.

Electronegativity

As discussed above, the electronegativity of a particular ion determines its ability to accelerate the leavener reaction rate in a given leavening system. It was discovered that magnesium chloride functions with sodium-based leavening systems to accelerate the leavening reaction rate, even in a dough containing a reduced amount of leavening agents.

Sodium has an electronegativity of about 0.93, while magnesium has an electronegativity of about 1.13. This difference in electronegativity of magnesium as the alternate counter ion, representing about a 21% increase in electronegativity over sodium, is believed to accelerate the leavener reaction rate. While not intending to be bound by theory, it is believed that an alternate counter ion electronegatvity that is equal to, or that is at least about 10% greater than, or at least about 20% greater than, the electonegativity of the leavening agent ion, increases the leavening reaction rate. As the difference in electronegativity between the alternate counter ion and the leavening agent ion increases, it is believed that the degree of leavening reaction rate acceleration will also increase.

Carnallite is a hydrated potassium magnesium chloride having the formula $KMgCl_3 \cdot 6(H_2O)$. It is believed that alternate counter ions from carnallite facilitate the dissociation of the leavening acid salts, resulting in an accelerated reaction rate as compared to the reaction rate of the leavening agents without carnallite. A proposed mechanism of action is shown in FIG. 1.

Other types of magnesium-containing ingredients may be useful in accelerating the leavening reaction rate in dough products. In addition to magnesium, other alternate counterions are suitable for use in the leavening reaction regulation methods and systems described herein.

The effects of magnesium chloride, carnallite and potassium chloride on the leavening reaction rate in a dough product are described in the following examples which are intended to demonstrate, but not limit the scope of, this invention. Dough formulas used were the same or substantially the same except for the leavening ingredients and the sources of alternate counterions, with minor modifications made to the amount of flour to accommodate for differences between samples in the amounts of the leavening ingredients and sources of alternate counterions.

Example 1—Effects of Added Salts and Reduced Leavening Agents

A control dough was prepared using flour, water, fat, leavening agents, salt, and other ingredients as shown in Table 1. A reduced-leavener test dough was prepared, having about 40% less leavening agents than the control dough, in other words, 60% of the leavening agents used in the control dough, and optionally an added source of an alternate counter ion, as shown in Table 1. The alternate counter ion was selected from the group of magnesium chloride, potassium chloride, and carnal.

TABLE 1

| Ingredient | 100% Leavened Control Formula | 60% Leavened Test Dough Formula | 60% Leavened Test Dough With Added Counter Ion |
|---|---|---|---|
| Flour | 50% | 51% | 50% |
| Water | 27% | 27% | 27% |
| Fat | 12.68% | 12.70% | 12.70% |
| Sugar | 6% | 6% | 6% |
| Minor Ingredients | 1.30% | 1.31% | 1.31% |
| SAPP | 1.12% | 0.67% | 0.67% |
| SALP | 0.17% | 0.10% | 0.10% |
| NaCl | 1.29% | 0.80% | 0.80% |
| Sodium Bicarbonate | 0.97% | 0.58% | 0.58% |
| Alternate Counter Ion | 0% | 0% | 0.50% |

Figure 2:
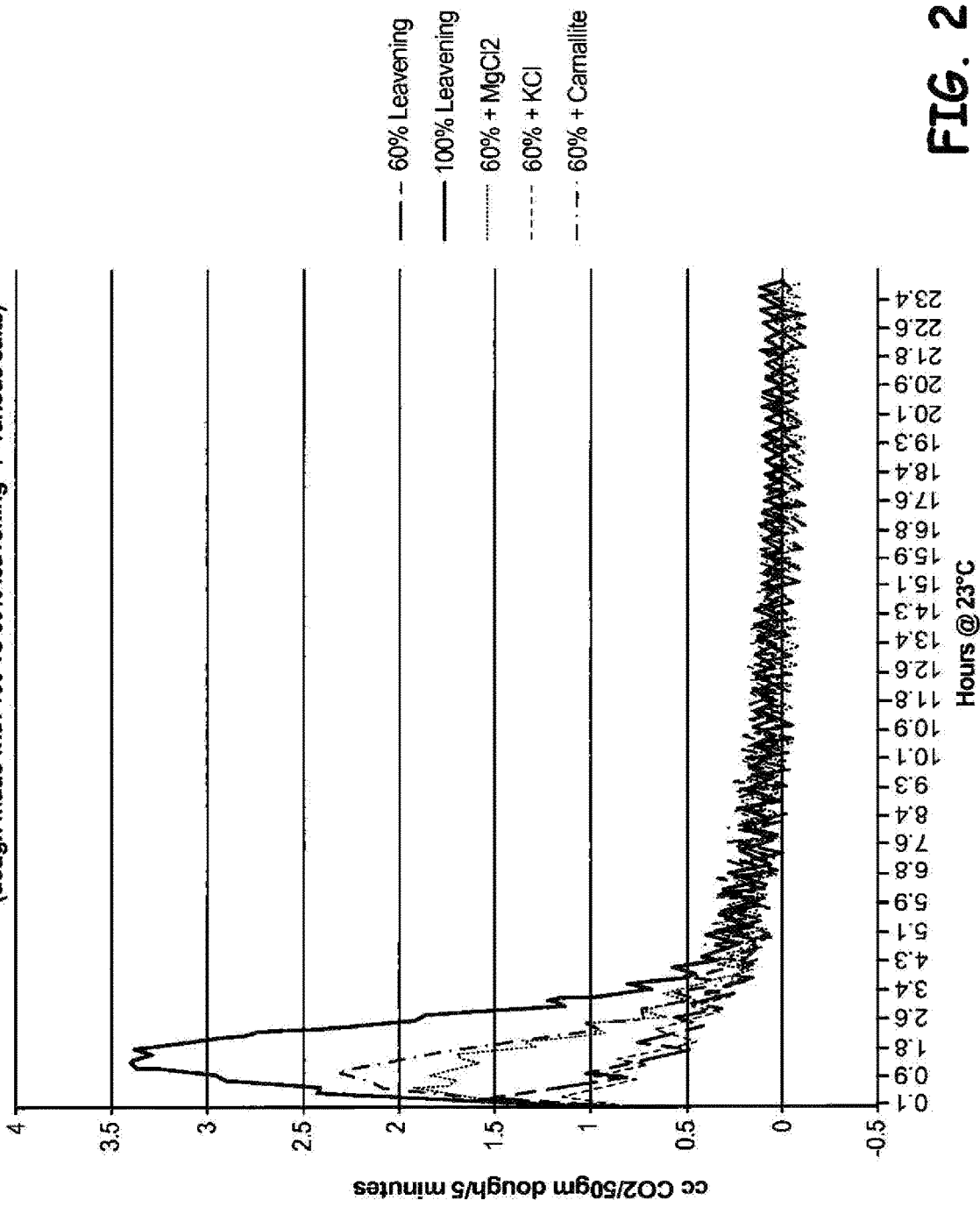
FIG. 2 is a graphical representation of data measuring the rate of carbon dioxide generation over time for dough products.

50 g samples of each dough were prepared, and the amount of carbon dioxide generated over time at 23° C. was measured in 5 minute intervals for 24 hours. The results are shown in FIG. 2, which shows that reducing the leavening level by 40% caused a significant decrease in the rate of carbon dioxide generation by the leavening reaction. Adding magnesium chloride or carnallite to this reduced-leavener dough elevated the carbon dioxide generate rate to suitable levels, while potassium chloride did not have a similar effect. These findings demonstrate that the electronegativity of the alternate counter ion in comparison to the leavening ion affects the rate of the leavener reaction. Potassium has a lower electronegatvity compared to sodium, and therefore does not result in the rate acceleration observed by adding sources of magnesium or carnallite to the dough.

Figure 3:
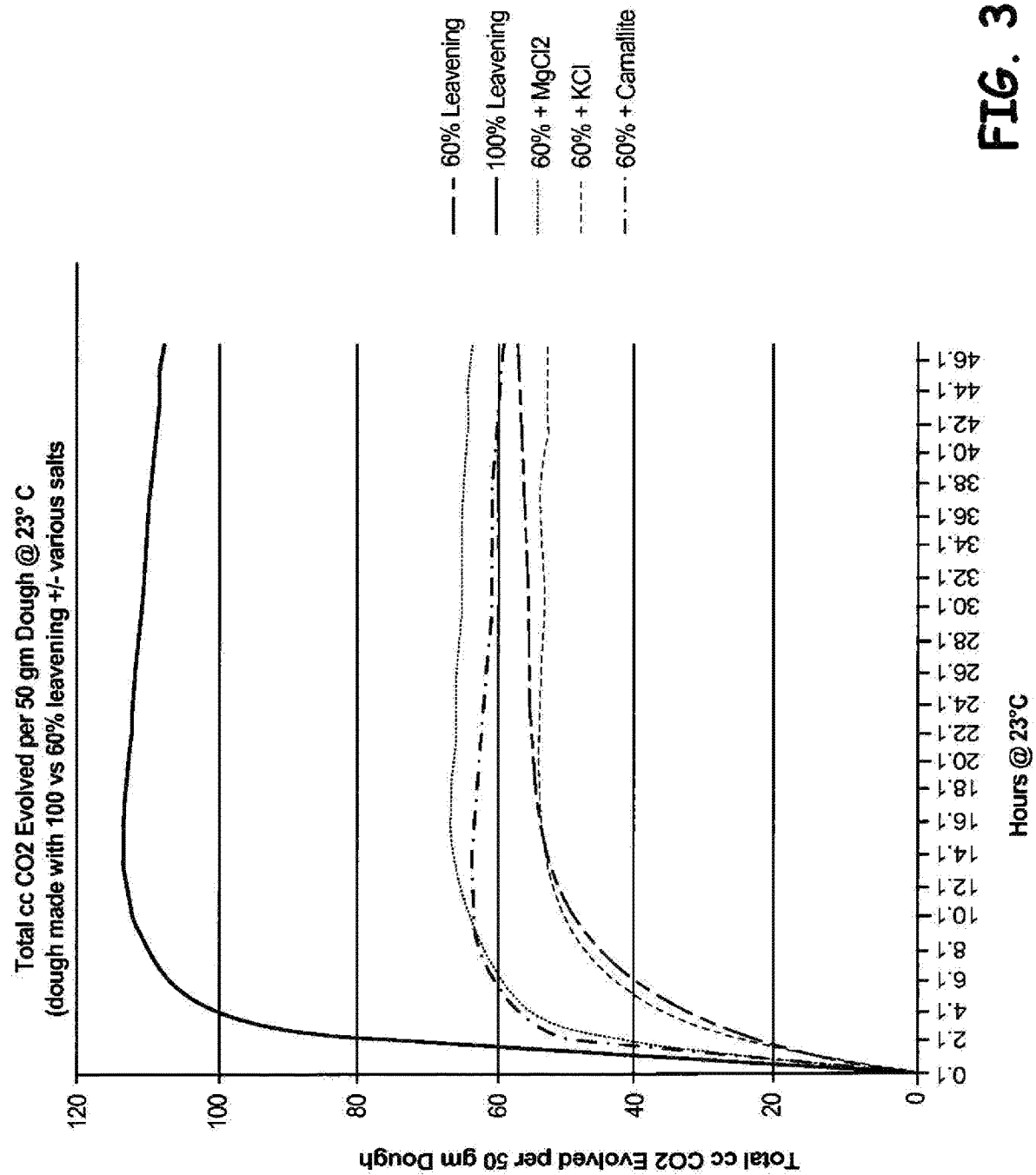
FIG. 3 is a graphical representation of data measuring the total amount of carbon dioxide generated over time for dough products.

The total amount of carbon dioxide generated was also measured for each dough, and the results are shown in FIG. 3. The 60% leavened dough formulas with added magnesium chloride or carnallite unexpectedly generated more total carbon dioxide than the 60% leavened dough formula, evidencing a more complete leavening reaction with the addition of these sources of alternate counter ions.

Example 2—Carnallite in Low Leavener Dough Products

As described above, it is believed that alternate counter ions from carnallite facilitate the dissociation of the leavening acid salts, resulting in an accelerated reaction rate as compared to the reaction rate of the leavening agents without carnallite.

Various aspects of this unexpected leavening reaction rate acceleration were evaluated. The effects of reducing the overall leavening level of a dough containing a sodium acid pyrophosphate/sodium aluminum phosphate/sodium bicarbonate leavening system, and including carnallite to accelerate the reaction rate in this reduced leavening system, were measured. Dough was prepared by combining about 52% flour, 28% water, 9.3% fat, 6% sugar, 1.3% minor ingredients and the leavening agents and carnallite at the levels shown in Table 2a. The dough was then canned and the cans were closed. The canned dough was then proofed at about 70° F. (ambient) for 24 hours, and the can pressures were measured by measuring can end deflection using a digital height indicator or similar instrument, and performing regression analysis of the measurement to compare it to end deflection measurement of cans with known can pressure levels.

The results, including a comparison with a dough containing the full amount (100%) of the leavening system with and without carnallite added to the dough, are shown in Table 2. All percentages are provided as weight percentage (wt-%) unless indicated otherwise. As used herein, the leavening level percent refers to the amount of leaveners used in the samples as compared to the fully-leavened control, which is designated as having a 100% leavening level.

TABLE 2a

Observed Can Pressures with Carnallite

| Treatment | Leavening Level (not weight percent) | SAPP wt-% | SALP wt-% | Sodium Bicarbonate wt-% | Carnallite wt-% | 24 Hour Average Pressure (psi) |
|---|---|---|---|---|---|---|
| Control | 100% | 1.122 | 0.173 | 0.974 | 0% | 17.9 |
| T2 | 100% | 1.122 | 0.173 | 0.974 | 0.25% | 19.0 |
| T3 | 100% | 1.122 | 0.173 | 0.974 | 0.45% | 19.2 |
| T4 | 90% | 1.010 | 0.156 | 0.877 | 0.25% | 15.8 |
| T5 | 90% | 1.010 | 0.156 | 0.877 | 0.45% | 16.7 |

Samples T2 and T3 containing 100% leavening level with added carnallite resulted in increased can pressures as compared to the Control. Samples T4 and T5 contained 90% of the Control leavening and carnallite, and resulted in can pressures within normal ranges.

Can pressure was correlated with leavening level, carnallite level and salt (sodium chloride) level as described by the following equation:

$$PSI = -7.786 + 0.2475(\text{leavening level}) + 3.1(\text{carnallite \%}) + 0.907(\text{NaCl \%})$$

Using this equation, the following estimated can pressures in Table 2b were calculated, closely representing the observed can pressure values shown above in Table 2a.

TABLE 2b

Calculated Can Pressures with Carnallite

| Leavening Level (not weight percent) | Carnallite wt-% | Calculated/Predicted PSI |
|---|---|---|
| 100% | 0 | 18.1 |
| 100% | 0.25 | 18.9 |
| 100% | 0.45 | 19.5 |
| 90% | 0 | 15.7 |
| 90% | 0.25 | 16.4 |
| 90% | 0.45 | 17.1 |

This Example demonstrates that when using a reduced level of leavening agents, low pressure issues can be overcome by adding carnallite with the leavening agents. The resulting final can pressures are within suitable ranges for canned refrigerated dough products, and can be predicted and controlled based on the equation described above.

Example 3—Carnallite as a Leavening Reaction Accelerant

The effect of carnallite was further studied to identify under what conditions this source of alternate counter ions has its greatest effect on canned dough products.

Table 3 shows the effects of adding carnallite to full-sodium and reduced-sodium leavened dough products. Dough was prepared, packaged and proofed as described in Example 1. Can pressure was measured at about 3-5 hours after canning the dough, and then again at about 24 hours after canning.

TABLE 3

Early PSI and 24 Hour PSI Results

| Treatment | Leavening Level (not weight percent) | SAPP wt-% | SALP wt-% | Sodium Bicarbonate wt-% | Carnallite wt-% | NaCl wt-% | Early PSI (hours after canning) | 24 Hour Final PSI |
|---|---|---|---|---|---|---|---|---|
| Control | 100% | 1.122 | 0.173 | 0.97 | 0 | 1.30 | 5.4 psi (4.5 hr) | 19.3 |
| T2 | 80% | 0.898 | 0.138 | 0.776 | 0 | 1.30 | 11.7 psi (3.5 hr) | 14.7 |
| T3 | 80% | 0.898 | 0.138 | 0.776 | 0.5 | 1.30 | 12.3 psi (3.5 hr) | 15.2 |

TABLE 3-continued

Early PSI and 24 Hour PSI Results

| Treatment | Leavening Level (not weight percent) | SAPP wt-% | SALP wt-% | Sodium Bicarbonate wt-% | Carnallite wt-% | NaCl wt-% | Early PSI (hours after canning) | 24 Hour Final PSI |
|---|---|---|---|---|---|---|---|---|
| T4 | 80% | 0.898 | 0.138 | 0.776 | 0.2 | 0.65 | 7.4 psi (3 hr) | 14.0 |
| T5 | 80% | 0.898 | 0.138 | 0.776 | 0.5 | 0.65 | 8.1 psi (2.5 hr) | 14.3 |

The Early PSI pressure column shows that the Control had the lowest pressure at 4.5 hours even though it had the greatest amount of leavening, and the pressure was measured for the greatest amount of time after canning, of all the samples. The treatments containing less leavening and with added carnallite (Samples T2-T5), resulted in a faster proofing rate that approaches the desired pressure in just a few hours. Samples T4 and T5 demonstrate that the proofing rate can be accelerated by the addition of carnallite even in a reduced leavener and reduced salt dough product.

It can be seen that carnallite can be added to these products to accelerate the reaction rate and to achieve the desired final can pressure ranges. In this Example, the leavener regulation system caused the chemically-leavened dough product to generate gas at a rate of between about 1.4 psi/hour and about 4.2 psi/hour within 5 hours at about 70° F. or ambient temperatures after the dough product had been packaged.

Different levels of reaction rate acceleration may be useful depending on the dough, leavening, and packaging systems, and desired reaction time duration. Other examples of accelerated gas generation rates are between about 2.5 psi/hour to about 3.2 psi/hour within a period of about 3 hours after packaging.

Example 4—Mechanism of Action of Alternate Counter Ions

To better understand the specific effects of sources of alternate counter ions, such as carnallite, on dough leavening, the pH of the following samples was measured, and the results are presented in Table 4. "DI water" as used herein refers to deionized water.

TABLE 4 pH Effects of Carnallite

| Sample | pH |
|---|---|
| Deionized water | 7.0 |
| 60 ml DI water + 6 gm Carnallite | 7.95 |
| 60 ml DI water + 2 gm SAPP | 4.18 |
| 60 ml DI water + 2 gm SAPP + 2 gm Carnallite | 3.16 |
| 60 ml DI water + 2 gm SALP | 5.63 |
| 60 ml DI water + 2 gm SALP + 2 gm Carnallite | 5.27 |

Addition of carnallite to the SAPP solution resulted in a drop of 1 pH unit. From these results, it is believed that carnallite, as source of alternate cationic counter ions, accelerates dissociation of hydrogen from the phosphoric acid salt because of the greater affinity of carnallite cations for the phosphate anion. The accelerated hydrogen ion dissociation is evidenced by the lower pH values shown in Table 4, leading to more rapid carbon dioxide generation, and therefore an increased leavening rate. A proposed mechanism is shown in FIG. 1.

It is believed that a mechanism similar to the one shown in FIG. 1 will take place with other sources of alternate counter ions, such as other halide salts including magnesium chloride described above, depending on the valency and/or ionic potential of the alternation counter ions.

Example 5—Low Sodium Dough Products

A low sodium dough suitable for being packaged and stored under refrigeration or frozen conditions was prepared by combining about 52% flour, 28% water, 9.3% fat, 6% sugar and 1.3% minor ingredients, with the salt and leavening ingredient combinations shown in Table 5.

TABLE 5

| Ingredient | Control Dough with 100% leavening | Dough with 80% Leavening | Dough with Alternate Leavening |
|---|---|---|---|
| NaCl | 1.3% | 0.65% | 0.65% |
| KCl | 0.0% | 0.65% | 0.65% |
| Carnallite | 0.0% | 0.45% | 0.45% |
| Sodium Bicarbonate | 0.97% | 0.78% | 0.97% |
| Sodium Acid Pyrophospate | 1.122% | 0.9% | 0.0% |
| Sodium Aluminum Phosphate | 0.173% | 0.14% | 0.0% |
| Calcium Acid Pyrophosplate | 0.0% | 0.0% | 1.325% |
| Final 24 Hour Can Pressure | 19 psi | 14 psi | 14 psi |
| Mg Sodium Per 58 g Serving | 600 mg | 450 mg | 300 mg |
| % Sodium Reduction from Control | n/a | 25% | 50% |

The resulting dough products had the indicated percentages of sodium reduction, and final can pressures within operable ranges. When using an alternate leavening system such as calcium acid pyrophosphate, inconsistent reaction rates that have been previously observed in a conventional dough can be regulated by the addition of a source of alternate counter ions such as carnallite or magnesium chloride.

Sodium reduction in dough products can have many implications on the dough chemistry, depending on how and with what the sodium-containing ingredients are reduced or replaced. In a control dough with a conventional level of sodium salt, the resulting sodium level creates a dough environment in which the sodium-based leavening agents are less soluble, so the majority of the leavening reaction takes place later in the dough manufacturing process, after the dough has been packaged. Upon reducing the sodium salt content of a dough, the common ion effect of sodium is reduced, thereby creating an environment in which the sodium-based leavening agents are more soluble and may react too early in the dough manufacturing process.

If the leavening reaction occurs too early in the packaged or canned dough manufacturing process, the desired package or can pressures are challenging to achieve. To mitigate the common ion reduction effect observed when reducing the sodium salt content of dough products, alternate counter ions added to the dough formula may be used to increase the reaction rate of the leavening agent after the dough has been packaged to generate the desired package pressure even if some of the leavening reaction has taken place earlier in the dough manufacturing process.

As demonstrated by the Examples, the use of an alternate counter ion with a dough leavening system provides the ability to generate suitable can pressures within the desired timeframe, for example, about 24 hours, in dough products containing a reduced amount of leavening. The dough may contain about 10% to about 60% less leavening than a similarly formulated control dough, in other words, about 40% to about 90% of the level of leavening in a similarly formulated control dough, and yet still attain can pressures within suitable ranges, such as about 12 psi to about 21 psi, or from about 14 psi to about 19 psi, within the desired timeframe. In some embodiments, the rate of the leavening reaction is greater during about the first 5 hours of proofing at about 70° F., ranging from about 1 psi/hour to about 5 psi/hour.

Furthermore, the use of an alternate counter ion with a dough leavening system provides the ability to compensate for the reduced common ion effect of sodium in lower sodium canned dough products. The dough may contain from about 20% to about 60% less sodium than a similarly formulated control dough, and yet still attain can pressures within suitable levels, for example ranging from about 12 psi to about 21 psi, or from about 14 psi to about 19 psi, even in dough products containing a reduced level or a complete elimination of sodium-containing leavening agents.

Although the foregoing Examples demonstrate the use of magnesium chloride carnallite as a source of alternate counter ions, it is contemplated that many other sources of alternate counter ions may be used in accordance with this invention to accelerate or otherwise regulate the leavening reaction rate. For example, other halide salts, may be used alone or in combination as sources of alternate counter ions. The mechanism of action shown in FIG. 1 depicts a cationic counter ion reaction, but an anionic counter ion reaction is also contemplated to be within the scope of this invention.

Other variations of the embodiments described herein are encompassed by the scope of the invention. The invention includes all modifications and equivalents of the subject matter recited in the claims as permitted by applicable law, and nothing contained in this description is intended to limit the scope of the invention, which is set forth in the appended claims.

What is claimed is:

1. A method for regulating the reaction rate of a leavening system in a dough having at least one leavening agent capable of forming leavening agent counter ions in the dough,
    wherein the at least one leavening agent includes
        a leavening acid capable of dissociating into leavening acid ions in the dough and
        a leavening base capable of dissociating into leavening base ions in the dough,
    the method comprising
        adding to the dough a source of an alternate counter ion of at least one leavening agent ion, the alternate counter ion having an equal or greater electronegativity than the leavening agent counter ion of the at least one leavening agent ion,
    wherein said leavening acid consists of a slow-acting leavening acid,
    wherein said source of an alternate counter ion comprises carnallite,
    wherein the carnallite is added to the dough in an amount of about 0.2% to about 0.5% by weight of the dough, and
    wherein a reaction of at least one leavening acid ion or at least one leavening base ion with the alternate counter ion results in an accelerated production of carbon dioxide.

2. The method of claim 1, wherein the at least one leavening agent ion reacts with the alternate counter ion preferentially over the leavening agent counter ion.

3. The method of claim 1, wherein the alternate counter ion has a greater ionic potential than the leavening agent counter ion.

4. The method of claim 1, wherein the alternate counter ion has an equivalent or higher valency than the leavening agent counter ion.

5. The method of claim 1, wherein the reaction rate of the leavening system is increased by providing the alternate counter ion.

6. The method of claim 1, further comprising:
    mixing the leavening system and the source of the alternate counter ion with dough ingredients to form a chemically-leavened dough;
    said dough being capable of achieving a desired gas-generation rate in the dough that is greater than a gas-generation rate of the leavening system in the same dough made without the alternate counter ion.

7. The method of claim 6, further comprising packaging the dough such that the leavening system with the alternate counter ion generates gas within the package.

8. The method of claim 7, further comprising storing the packaged dough at refrigerated or frozen temperatures after gas has been generated in the dough.

9. The method of claim 1, wherein
    the leavening acid is selected from the group consisting of sodium aluminum phosphate, sodium acid pyrophosphate, sodium aluminum sulfate, glucono-delta-lactone, dicalcium phosphate, calcium acid pyrophosphate, dimagnesium phosphate, potassium acid pyrophosphate, and a combination thereof; and
    the leavening base is selected from the group consisting of sodium bicarbonate, potassium bicarbonate, ammonium bicarbonate, sodium carbonate, calcium carbonate, and a combination thereof.

10. The method of claim 1, wherein the source of an alternate counter ion further comprises magnesium chloride.

11. A method for preparing a chemically-leavened canned dough product, comprising:
    a. combining a chemical leavening agent and a regulating agent with dough ingredients to make a dough, wherein the chemical leavening agent includes
        a leavening acid capable of dissociating into leavening acid ions in the dough and
        a leavening base capable of dissociating into leavening base ions in the dough and
    the regulating agent is a source of an alternate counter ion;
    b. placing the dough in a can; and
    c. allowing the leavening agent and regulating agent to react in the dough to generate gas at a rate sufficient to expand the dough to substantially fill the can;

wherein the rate is greater than a rate of gas generation in a dough having the chemical leavening agent without the regulating agent, wherein said leavening acid consists of a slow-acting leavening acid, wherein said source of an alternate counter ion comprises carnallite, wherein the carnallite is included in an amount of about 0.2% to about 0.5% by weight of the dough, and wherein a reaction of at least one leavening acid ion or at least one leavening base ion with the alternate counter ion results in an accelerated production of carbon dioxide.

12. The method of claim 11, wherein the dough expands sufficiently to pressurize the can to an internal pressure level of about 12 psi or higher.

13. The method of claim 12, wherein the internal pressure level is generated in 24 hours or less at a temperature of about 70° F.

14. The method of claim 13, wherein an early pressure level of greater than 7 psi is reached in 5 hours or less at a temperature of about 70° F.

15. The method of claim 11, further comprising storing the canned dough at refrigeration temperatures after the dough has substantially filled the can.

16. The method of claim 11, wherein
the leavening acid is selected from the group consisting of sodium aluminum phosphate, sodium acid pyrophosphate, sodium aluminum sulfate, glucono-delta-lactone, dicalcium phosphate, calcium acid pyrophosphate, dimagnesium phosphate, potassium acid pyrophosphate, and a combination thereof; and
the leavening base is selected from the group consisting of sodium bicarbonate, potassium bicarbonate, ammonium bicarbonate, sodium carbonate, calcium carbonate, and a combination thereof.

17. The method of claim 11, wherein the source of an alternate counter ion further comprises magnesium chloride.

18. A leavener regulation system for a chemically-leavened dough product, the system comprising:
a chemically-leavened dough product comprising at least one leavening agent ion, wherein the at least one leavening agent ion includes at least one leavening acid ion and at least one leavening base ion;
a source of an alternate counter ion having an equivalent or greater electronegativity than the at least one of the leavening agent ions, resulting in an increased leavening reaction rate due to the alternate counter ion as compared to the same dough made without the leavener regulation system,
wherein the at least one leavening acid ion consists of at least one leavening acid ion formed from a slow-acting leavening acid,
wherein said source of an alternate counter ion comprises carnallite,
wherein the carnallite is included in an amount of about 0.2% to about 0.5% by weight of the dough product, and
wherein a reaction of at least one leavening acid ion or at least one leavening base ion with the alternate counter ion results in an accelerated production of carbon dioxide.

19. The leavener regulation system of claim 18, wherein the chemically-leavened dough product is canned, and the internal pressure within the can is at least about 14 psi within 24 hours at a temperature of about 70° F. after the dough has been canned.

20. The leavener regulation system of claim 19, wherein the leavener regulation system causes the chemically-leavened dough product to generate gas at a rate of between about 1.4 psi/hour and about 4.2 psi/hour within 5 hours at a temperature of about 70° F. after the dough product has been canned.

* * * * *